(12) United States Patent
Song (10) Patent No.: US 12,051,389 B2
(45) Date of Patent: Jul. 30, 2024

(54) DISPLAY DEVICE

(71) Applicant: LG ELECTRONICS INC., Seoul (KR)

(72) Inventor: Chungwon Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/270,133

(22) PCT Filed: Jan. 5, 2021

(86) PCT No.: PCT/KR2021/000046
§ 371 (c)(1),
(2) Date: Jun. 28, 2023

(87) PCT Pub. No.: WO2022/149623
PCT Pub. Date: Jul. 14, 2022

(65) Prior Publication Data
US 2024/0071335 A1    Feb. 29, 2024

(51) Int. Cl.
*G09G 5/00* (2006.01)
*H02J 3/00* (2006.01)

(52) U.S. Cl.
CPC ............ *G09G 5/006* (2013.01); *H02J 3/0075* (2020.01); *G09G 2330/021* (2013.01); *G09G 2370/042* (2013.01); *G09G 2370/12* (2013.01); *G09G 2370/22* (2013.01)

(58) Field of Classification Search
CPC ... H02J 3/0075; G09G 5/006; G09G 2370/12; G09G 2370/22; G09G 2330/021; G09G 2370/042
See application file for complete search history.

(56) References Cited

U.S. PATENT DOCUMENTS 9,232,265 B2 * 1/2016 Maxwell ................... G06F 3/14
2006/0280055 A1 * 12/2006 Miller .................... G09G 5/006
398/155

(Continued)

FOREIGN PATENT DOCUMENTS

KR    10-2005-0012515 A    2/2005
KR       10-0682676 B1    2/2007

(Continued)

OTHER PUBLICATIONS

International Search Report (PCT/ISA/210) issued in PCT/KR2021/000046, dated Sep. 24, 2021.

*Primary Examiner* — Vinh T Lam
(74) *Attorney, Agent, or Firm* — Birch, Stewart, Kolasch & Birch, LLP (57) ABSTRACT

A display device includes a high definition multimedia interface (HDMI) input port to which an HDMI is connected, an HDMI receiver receiving an HDMI signal from a source device through the HDMI connected to the HDMI input port, a voltage sensor for sensing a voltage supplied from the source device, a hot plug detect (HPD) controller for transmitting an HPD signal to the source device when the voltage detected by the voltage sensor is higher than or equal to a predetermined voltage, and an auxiliary power supply for supplying a voltage higher than or equal to the predetermined voltage to the voltage sensor when the voltage is supplied from the source device.

20 Claims, 9 Drawing Sheets

(56) References Cited

U.S. PATENT DOCUMENTS

| | | | | |
|---|---|---|---|---|
| 2009/0027554 A1* | 1/2009 | Noh | ............... | H04N 5/445 348/558 |
| 2009/0077606 A1* | 3/2009 | Machida | ............... | G09G 5/006 725/118 |
| 2009/0079717 A1* | 3/2009 | Tsai | ............... | G09G 5/006 345/204 |
| 2009/0210591 A1* | 8/2009 | Tsai | ............... | G09G 5/003 710/69 |
| 2010/0023145 A1* | 1/2010 | Yagura | ............... | G09G 5/003 700/94 |
| 2010/0045867 A1 | 2/2010 | Bae | | |
| 2011/0025599 A1* | 2/2011 | Kim | ............... | G06F 3/1431 345/156 |
| 2011/0038595 A1* | 2/2011 | Kimoto | ............... | H04N 9/87 386/230 |
| 2012/0003863 A1* | 1/2012 | Sung | ............... | H04Q 1/136 439/489 |
| 2013/0048372 A1* | 2/2013 | Overby | ............... | G06F 11/3089 174/70 R |
| 2013/0219087 A1* | 8/2013 | Du | ............... | G09G 5/006 710/16 |
| 2013/0250128 A1* | 9/2013 | Wang | ............... | G09G 5/006 348/180 |
| 2013/0336631 A1* | 12/2013 | Kura | ............... | H04N 13/30 386/230 |
| 2014/0043538 A1* | 2/2014 | Wang | ............... | H04N 5/775 348/E5.062 |
| 2014/0043539 A1* | 2/2014 | Wang | ............... | G09G 5/006 348/E5.093 |
| 2014/0092305 A1* | 4/2014 | Doyle | ............... | H04N 5/44 348/553 |
| 2014/0300822 A1* | 10/2014 | Kabuto | ............... | H04N 21/43637 348/723 |
| 2017/0139456 A1* | 5/2017 | Alou | ............... | G06F 1/266 |
| 2018/0048848 A1* | 2/2018 | Park | ............... | H04N 21/44231 |
| 2019/0286206 A1* | 9/2019 | Alou | ............... | G06F 1/266 |
| 2019/0348010 A1* | 11/2019 | Oh | ............... | H04N 21/43632 |
| 2022/0021935 A1* | 1/2022 | Jang | ............... | G06F 3/04842 |
| 2022/0159335 A1* | 5/2022 | Jang | ............... | H04N 21/44231 |

FOREIGN PATENT DOCUMENTS

| | | |
|---|---|---|
| KR | 10-2007-0028053 A | 3/2007 |
| KR | 10-0820834 B1 | 4/2008 |
| KR | 10-2008-0066225 A | 7/2008 |
| KR | 10-2020-0127415 A | 11/2020 |

* cited by examiner

| Pin | Signal | Pin | Signal |
|---|---|---|---|
| 1 | TMDS Data 2+ | 2 | TMDS Data 2 Shield |
| 3 | TMDS Data 2- | 4 | TMDS Data 1+ |
| 5 | TMDS Data 1 Shield | 6 | TMDS Data 1- |
| 7 | TMDS Data 0+ | 8 | TMDS Data 0 Shield |
| 9 | TMDS Data 0- | 10 | TMDS Clock + |
| 11 | TMDS Clock Shield | 12 | TMDS Clock - |
| 13 | CEC | 14 | HEC Data- |
| 15 | CSL | 16 | SDA |
| 17 | DD/CEC Ground | 18 | +5V Power |
| 19 | Hot Plug Detect (HPD) | | |

DISPLAY DEVICE

CROSS REFERENCE TO RELATED APPLICATIONS

This application is the National Phase of PCT International Application No. PCT/KR2021/000046 filed on Jan. 5, 2021, which is hereby expressly incorporated by reference into the present application.

BACKGROUND OF THE DISCLOSURE

Technical Field

The present disclosure relates to a display device, and more particularly, to a display device that receives video/audio through a high definition multimedia interface (HDMI).

Discussion of the Related Art

Display devices, such as TVs, monitors, or laptops, can have an HDMI port to which an HDMI is connected. The HDMI is an abbreviation of high definition multimedia interface. The HDMI is one of the uncompressed digital video/audio interface standards, and provides an interface between a display device (a playback device, a sync device, etc.) and a source device such as a set-top box or a DVD player. The display device can receive an HDMI signal from a source device through an HDMI and output video and audio.

In such an HDMI, the standards for electrical signals, pin outputs, cables, and connector mechanisms are defined. In the HDMI that is properly manufactured according to the standard, a voltage of 5V can be supplied from the source device to the sync device through pin 18, and the sync device can transmit a hot plug detect (HPD) signal to the source device when the sync device receives the voltage of 5V through pin 18. The HPD is a communication mechanism between the source device and the sync device and is for recognizing connection/disconnection between the source device and the sync device.

When a non-standard HDMI is connected, the source device can supply a voltage lower than 5V to the sync device. In particular, when a low voltage lower than 2V is supplied from the source device to the sync device, the sync device cannot recognize whether the source device is connected. Accordingly, since an HPD signal is not transmitted, there occurs a problem in that the source device cannot recognize whether the sync device is connected. Accordingly, since the sync device cannot receive a video/audio signal from the source device, an image cannot be output, and the user experiences inconvenience because the image is not output even though the HDMI is connected.

SUMMARY The present disclosure aims to solve the above-described problems. In particular, the present disclosure provides a display device that solves the problem of not outputting an image when a non-standard HDMI is connected.

The present disclosure provides a display device that solves the problem that an image is not output because a voltage is not normally supplied from a source device when an HDMI is connected.

A display device according to an embodiment of the present disclosure includes a high definition multimedia interface (HDMI) input port to which an HDMI is connected, an HDMI receiver configured to receive an HDMI signal from a source device through the HDMI connected to the HDMI input port, a voltage sensor configured to sense a voltage supplied from the source device, a hot plug detect (HPD) controller configured to transmit an HPD signal to the source device when the voltage detected by the voltage detector is higher than or equal to a predetermined voltage, and an auxiliary power supply configured to supply a voltage higher than or equal to the predetermined voltage to the voltage detector when the voltage is supplied from the source device.

The auxiliary power supply can be connected between pin 18 of the HDMI input port and the voltage detector. The display device can further include a switch configured to be turned on when the voltage is supplied from the source device and a normal voltage part connected to the switch and configured to supply a voltage higher than or equal to the predetermined voltage.

In addition, a base of the switch can be connected to pin 18 of the HDMI input port, a collector of the switch is connected to the normal voltage part, and an emitter of the switch is connected to the voltage detector. Further, the voltage supplied by the standby voltage part cancan be lower than the voltage supplied by the normal voltage part.

Also, the auxiliary power supply can include a first diode disposed between the switch and the normal voltage part and a second diode disposed between the switch and the standby voltage part. In addition, the auxiliary power supply can include a switch configured to be turned on when the voltage is supplied from the source device and a standby voltage part connected to the switch and configured to supply a voltage higher than or equal to the predetermined voltage even when the display device is in a standby state. In addition, the auxiliary power supply can include a boosting circuit configured to boost the voltage supplied from the source device to the predetermined level or higher.

Advantages of the Present Disclosure

According to an embodiment of the present disclosure, even when a non-standard HDMI is connected to a display device, it is possible to recognize whether a source device is connected through an HDMI. Accordingly, there is an advantage that can solve the problem of not outputting video when a non-standard HDMI is connected. A display device can have an advantage that can more stably recognize the source device regardless of the level of voltage supplied from the source device connected through the HDMI, and can improve reliability. In addition, since the display device can supply voltage through an auxiliary power supply even in a standby state, there is an advantage in that the source device can be recognized regardless of the state of the display device.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

Figure 1:
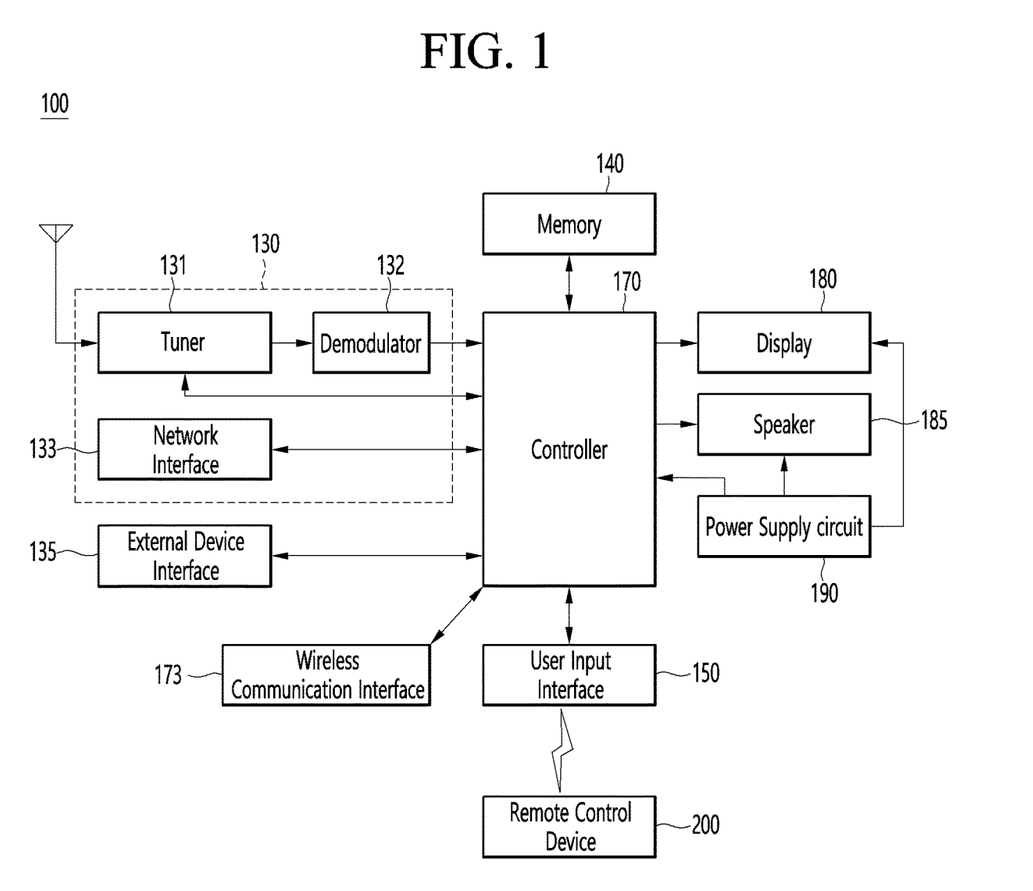
FIG. 1 is a block diagram showing a configuration of a display device according to an embodiment of the present disclosure.

FIG. 1 is a block diagram showing a configuration of a display device according to an embodiment of the present disclosure. Referring to FIG. 1, a display device 100 can include a broadcast receiver 130, an external device interface 135, a memory 140, a user input interface 150, a controller 170, a wireless communication interface 173, a display 180, a speaker 185, and a power supply circuit 190.

The broadcast receiver 130 can include a tuner 131, a demodulator 132, and a network interface 133. The tuner 131 can select a specific broadcast channel according to a channel selection command. The tuner 131 can receive a broadcast signal for the selected specific broadcast channel. The demodulator 132 can separate the received broadcast signal into an image signal, an audio signal, and a data signal related to a broadcast program, and restore the separated image signal, audio signal, and data signal to a format capable of being output.

The network interface 133 can provide an interface for connecting the display device 100 to a wired/wireless network including an Internet network. The network interface 133 can transmit or receive data to or from other users or other electronic devices through a connected network or another network linked to the connected network. The network interface 133 can access a predetermined web page through the connected network or the other network linked to the connected network. That is, it is possible to access a predetermined web page through a network, and transmit or receive data to or from a corresponding server.

In addition, the network interface 133 can receive content or data provided by a content provider or a network operator. That is, the network interface 133 can receive content such as movies, advertisements, games, video on demand (VOD), and broadcast signals and information related thereto provided from a content provider or a network provider through a network. In addition, the network interface 133 can receive update information and update files of firmware provided by the network operator, and can transmit data to an Internet or content provider or a network operator.

The network interface 133 can select and receive a desired application from among applications that are open to the public through a network. The external device interface 135 can receive an application or a list of applications in an external device adjacent thereto, and transmit the same to the controller 170 or the memory 140.

The external device interface 135 can provide a connection path between the display device 100 and an external device. The external device interface 135 can receive one or more of images and audio output from an external device connected to the display device 100 in a wired or wireless manner, and transmit the same to the controller 170. The external device interface 135 can include a plurality of external input terminals. The plurality of external input terminals can include an RGB terminal (e.g., a terminal emulator that can display true color), one or more High Definition Multimedia Interface (HDMI) terminals, and a component terminal.

The image signal of the external device input through the external device interface 135 can be output through the display 180. The audio signal of the external device input through the external device interface 135 can be output through the speaker 185. The external device connectable to the external device interface 135 can be any one of a set-top box, a Blu-ray player, a DVD player, a game machine, a sound bar, a smartphone, a PC, a USB memory, and a home theater, but these are only examples, the present disclosure is not limited thereto.

In addition, a part of content data stored in the display device 100 can be transmitted to a selected user among a selected user or a selected electronic device among other users or other electronic devices registered in advance in the display device 100. The memory 140 can store programs for signal processing and control of the controller 170, and can store images, audio, or data signals, which have been subjected to signal-processing.

In addition, the memory 140 can perform a function for temporarily storing images, audio, or data signals input from an external device interface 135 or the network interface 133, and store information on a predetermined image through a channel storage function. The memory 140 can store an application or a list of applications input from the external device interface 135 or the network interface 133.

The display device 100 can play back a content file (a moving image file, a still image file, a music file, a document file, an application file, or the like) stored in the memory 140 and provide the same to the user. The user input interface 150 can transmit a signal input by the user to the controller 170 or a signal from the controller 170 to the user. For example, the user input interface 150 can receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or can perform processing to transmit the control signal from the controller 170 to the remote control device 200.

In addition, the user input interface 150 can transmit a control signal input from a local key, such as a power key, a channel key, a volume key, and a setting value to the controller 170. The image signal image-processed by the controller 170 can be input to the display 180 and displayed as an image corresponding to a corresponding image signal. Also, the image signal image-processed by the controller 170 can be input to an external output device through the external device interface 135.

The audio signal processed by the controller 170 can be output to the speaker 185. Also, the audio signal processed by the controller 170 can be input to the external output device through the external device interface 135. In addition, the controller 170 can control the overall operation of the display device 100.

In addition, the controller 170 can control the display device 100 by a user command input through the user input interface 150 or an internal program and connect to a network to download an application a list of applications or applications desired by the user to the display device 100. The controller 170 can allow the channel information or the like selected by the user to be output through the display 180 or the speaker 185 along with the processed image or audio signal.

In addition, the controller 170 can output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 can allow the display 180 to display an image, for example, allow a broadcast image which is input through the tuner 131 or an external input image which is input through the external device interface 135, an image which is input through the network interface or an image which is stored in the memory 140 to be displayed on the display 180. In this instance, an image being displayed on the display 180 can be a still image or a moving image, and can be a 2D image or a 3D image.

In addition, the controller 170 can allow content stored in the display device 100, received broadcast content, or external input content input from the outside to be played back, and the content can have various forms such as a broadcast image, an external input image, an audio file, still images, accessed web screens, and document files.

The wireless communication interface 173 can communicate with an external device through wired or wireless communication. The wireless communication interface 173 can perform short range communication with an external device. To this end, the wireless communication interface 173 can support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 can support wireless communication between the display device 100 and a wireless communication system, between the display device 100 and another display device 100, or between the display device 100 and a network in which the display device 100 (or an external server) is located through wireless area networks. The wireless area networks can be wireless personal area networks.

Here, the other display device 100 can be a wearable device, e.g., a smartwatch, smart glasses or a head mounted display (HMD) or a mobile terminal, such as a smart phone, which is able to exchange data (or interwork) with the display device 100 according to the present disclosure. The wireless communication interface 173 can detect (or recognize) a wearable device capable of communication around the display device 100. Furthermore, when the detected wearable device is an authenticated device to communicate with the display device 100 according to the present disclosure, the controller 170 can transmit at least a portion of data processed by the display device 100 to the wearable device through the wireless communication interface 173. Therefore, a user of the wearable device can use data processed by the display device 100 through the wearable device.

The display 180 can convert image signals, data signals, and OSD signals processed by the controller 170, or image signals or data signals received from the external device interface 135 into R, G, and B signals, and generate drive signals. Meanwhile, since the display device 100 shown in FIG. 1 is only an embodiment of the present disclosure, some of the illustrated components can be integrated, added, or omitted depending on the specification of the display device 100 that is actually implemented.

That is, two or more components can be combined into one component, or one component can be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 can receive an image through the network interface 133 or the external device interface 135 without a tuner 131 and a demodulator 132 and play back the same.

For example, the display device 100 can be divided into an image processing device, such as a set-top box, for receiving broadcast signals or content according to various network services, and a content playback device that plays back content input from the image processing device. In this instance, an operation method of the display device according to an embodiment of the present disclosure will be described below can be implemented by not only the display device 100 as described with reference to FIG. 1 and but also one of an image processing device such as the separated set-top box and a content playback device including the display 180 the audio output unit 185.

Next, the remote control device according to an embodiment of the present disclosure will be described with reference to FIGS. 2 and 3. In particular, FIG. 2 is a block diagram of a remote control device according to an embodiment of the present disclosure, and FIG. 3 shows an actual configuration example of a remote control device 200 according to an embodiment of the present disclosure.

Figure 2:
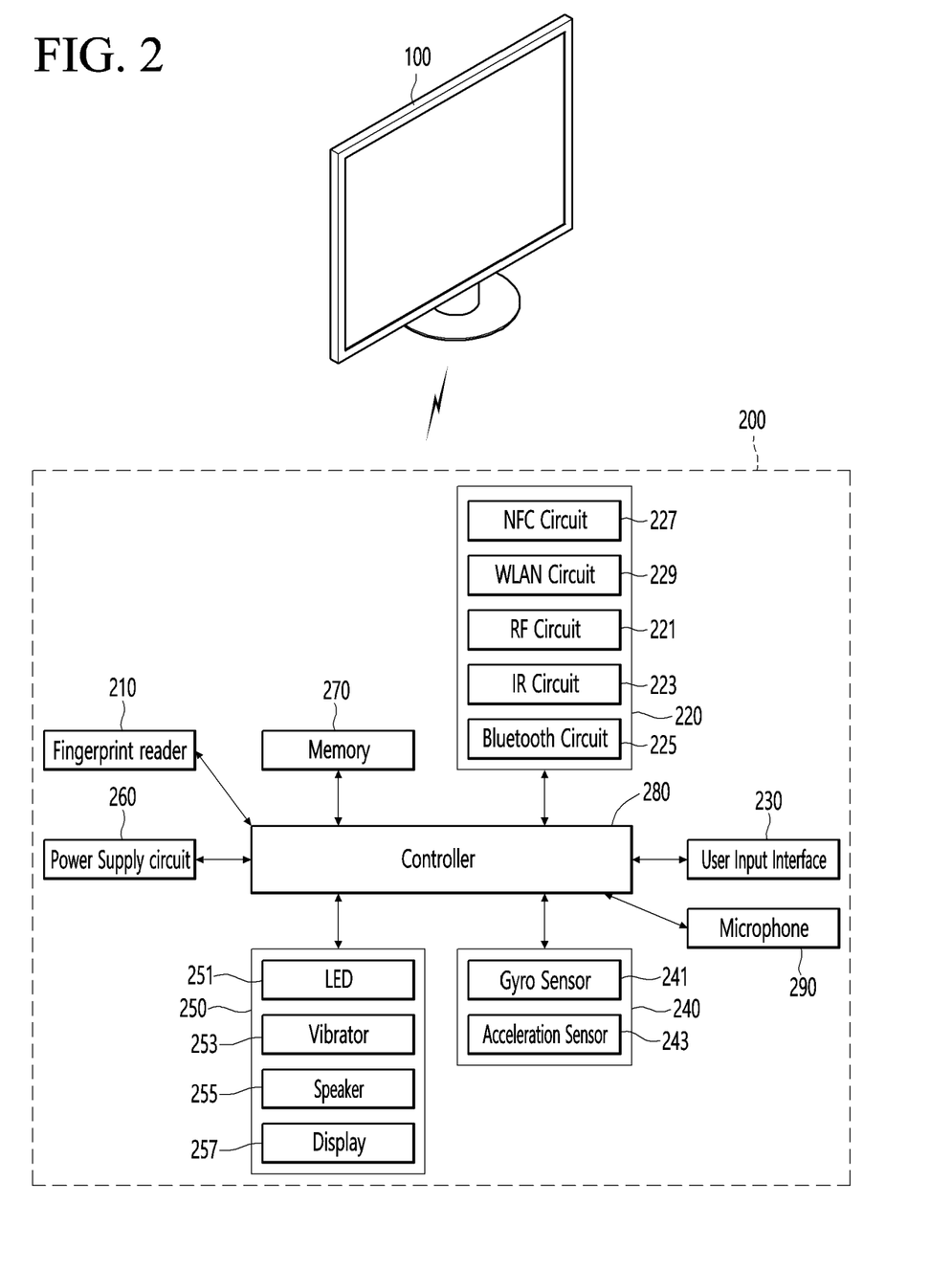
FIG. 2 is a block diagram of a remote control device according to an embodiment of the present disclosure.
Figure 3:
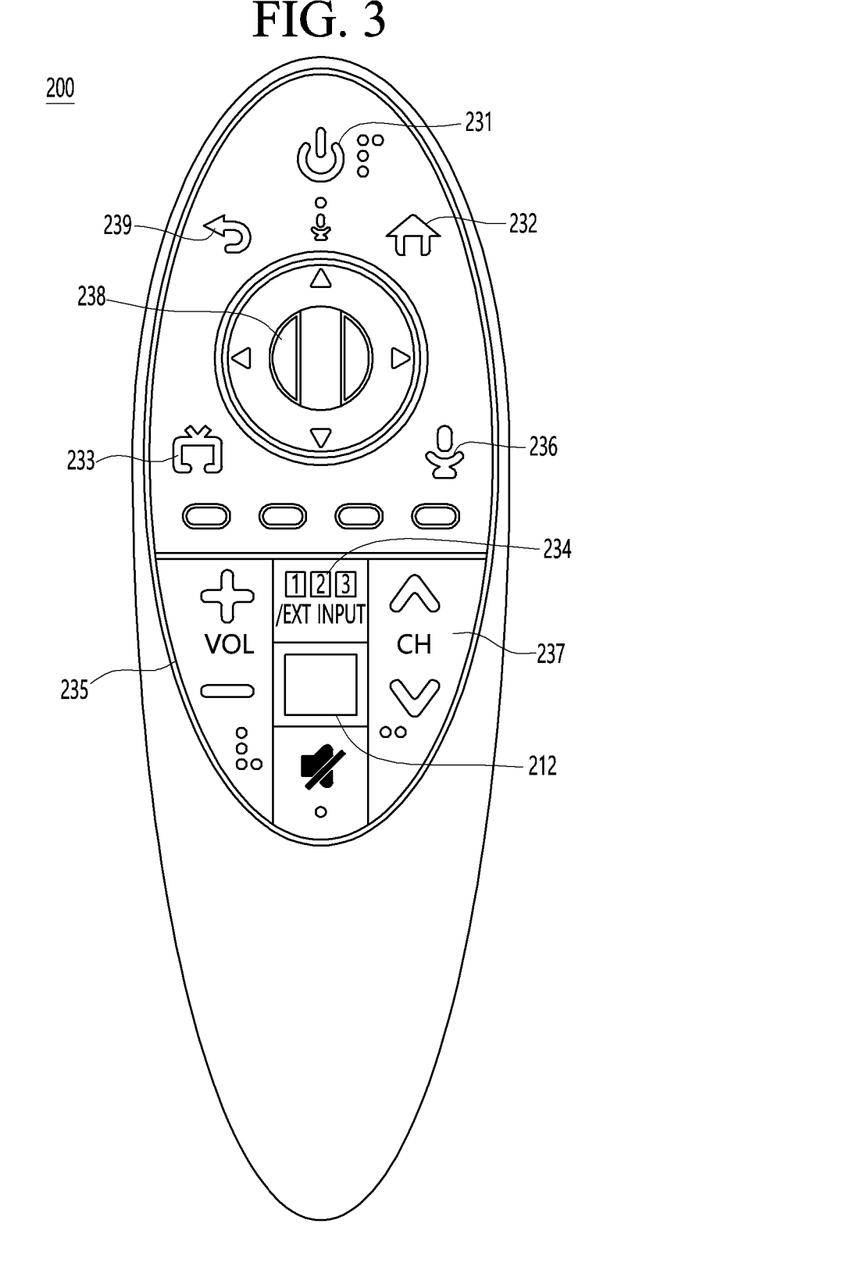
FIG. 3 shows an actual configuration example of a remote control device 200 according to an embodiment of the present disclosure.

First, referring to FIG. 2, the remote control device 200 can include a fingerprint reader 210, a wireless communication circuit 220, a user input interface 230, a sensor 240, an output interface 250, a power supply circuit 260, a memory 270, a controller 280, and a microphone 290. Referring to FIG. 2, the wireless communication circuit 220 can transmit and receive signals to and from any one of display devices according to embodiments of the present disclosure described above.

The remote control device 200 can include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 can include a Bluetooth circuit 225 capable of transmitting and receiving signals to and from the display device 100 according to the Bluetooth communication standard. In addition, the remote control device 200 can include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 can transmit a signal containing information on the movement of the remote control device 200 to the display device 100 through the wireless communication circuit 220. In addition, the remote control device 200 can receive a signal transmitted by the display device 100 through the RF circuit 221, and transmit a command regarding power on/off, channel change, volume adjustment, or the like to the display device 100 through the IR circuit 223 as necessary.

The user input interface 230 can include a keypad, a button, a touch pad, a touch screen, or the like. The user can input a command related to the display device 100 to the remote control device 200 by operating the user input interface 230. When the user input interface 230 includes a hard key button, the user can input a command related to the display device 100 to the remote control device 200 through a push operation of the hard key button. Details will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 can be a button for recognizing a user's fingerprint. In one embodiment, the fingerprint recognition button 212 can enable a push operation, and thus can receive a push operation and a fingerprint recognition operation. The power button 231 can be a button for turning on/off the power of the display device 100. The home button 232 can be a button for moving to the home screen of the display device 100. The live button 233 can be a button for displaying a real-time broadcast program. The external input button 234 can be a button for receiving an external input connected to the display device 100. The volume control button 235 can be a button for adjusting the level of the volume output by the display device 100. The voice recognition button 236 can be a button for receiving a user's voice and recognizing the received voice. The channel change button 237 can be a button for receiving a broadcast signal of a specific broadcast channel. The OK button 238 can be a button for selecting a specific function, and the back-play button 239 can be a button for returning to a previous screen.

A description will be given referring again to FIG. 2. When the user input interface 230 includes a touch screen, the user can input a command related to the display device 100 to the remote control device 200 by touching a soft key of the touch screen. In addition, the user input interface 230 can include various types of input means that can be operated by a user, such as a scroll key or a jog key, and the present embodiment does not limit the scope of the present disclosure.

The sensor 240 can include a gyro sensor 241 or an acceleration sensor 243, and the gyro sensor 241 can sense information regarding the movement of the remote control device 200. For example, the gyro sensor 241 can sense information about the operation of the remote control device 200 based on the x, y, and z axes, and the acceleration sensor 243 can sense information about the moving speed of the remote control device 200. Meanwhile, the remote control device 200 can further include a distance measuring sensor to sense the distance between the display device 100 and the display 180.

The output interface 250 can output an image or audio signal corresponding to the operation of the user input interface 230 or a signal transmitted from the display device 100. The user can recognize whether the user input interface 230 is operated or whether the display device 100 is controlled through the output interface 250. For example, the output interface 250 can include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication circuit 220.

In addition, the power supply circuit 260 can supply power to the remote control device 200, and stop power supply when the remote control device 200 has not moved for a predetermined time to reduce power consumption. The power supply circuit 260 can restart power supply when a predetermined key provided in the remote control device 200 is operated.

The memory 270 can store various types of programs and application data required for control or operation of the remote control device 200. When the remote control device 200 transmits and receives signals wirelessly through the display device 100 and the RF circuit 221, the remote control device 200 and the display device 100 transmit and receive signals through a predetermined frequency band. The controller 280 of the remote control device 200 can store and refer to information on a frequency band capable of wirelessly transmitting and receiving signals to and from the display device 100 paired with the remote control device 200 in the memory 270.

The controller 280 can control all matters related to the control of the remote control device 200. The controller 280 can transmit a signal corresponding to a predetermined key operation of the user input interface 230 or a signal corresponding to the movement of the remote control device 200 sensed by the sensor 240 through the wireless communication circuit 220.

Also, the microphone 290 of the remote control device 200 can obtain a speech. A plurality of microphones 290 can be provided.

Figure 4:
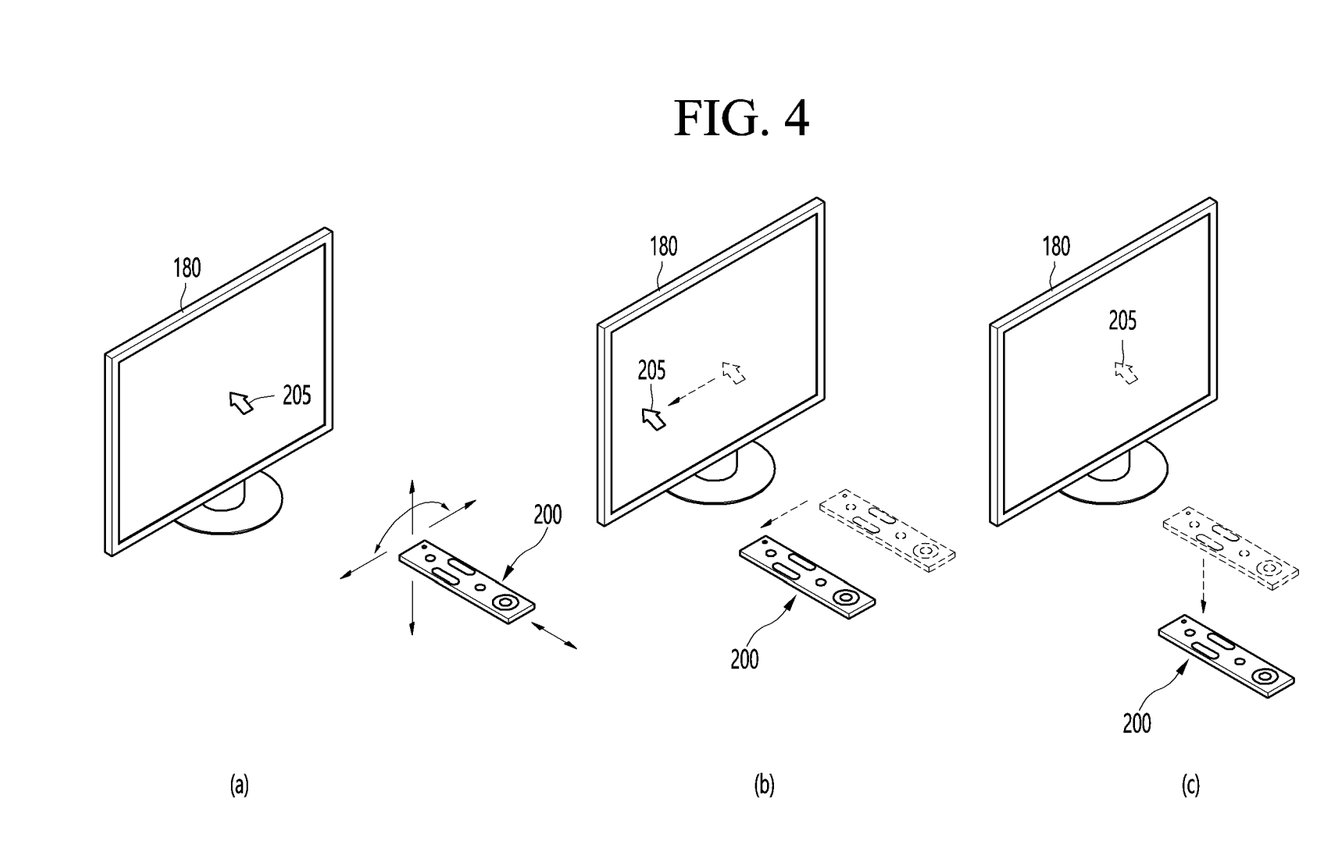
FIG. 4 shows an example of using a remote control device according to an embodiment of the present disclosure.

Next, a description will be given referring to FIG. 4. In particular, FIG. 4 shows an example of using a remote control device according to an embodiment of the present disclosure. FIG. 4(*a*) illustrates that a pointer 205 corresponding to the remote control device 200 is displayed on the display 180.

The user can move or rotate the remote control device 200 up, down, left and right. The pointer 205 displayed on the display 180 of the display device 100 can correspond to the movement of the remote control device 200. As shown in the drawings, the pointer 205 is moved and displayed according to movement of the remote control device 200 in a 3D space, so the remote control device 200 can be called a space remote control device.

FIG. 4(*b*) illustrates that when the user moves the remote control device 200 to the left, the pointer 205 displayed on the display 180 of the display device 100 moves to the left correspondingly. Information on the movement of the remote control device 200 detected through a sensor of the remote control device 200 is transmitted to the display device 100. The display device 100 can calculate the coordinates of the pointer 205 based on information on the movement of the remote control device 200. The display device 100 can display the pointer 205 to correspond to the calculated coordinates.

FIG. 4(*c*) illustrates that a user moves the remote control device 200 away from the display 180 while pressing a specific button in the remote control device 200. Accordingly, a selected area in the display 180 corresponding to the pointer 205 can be zoomed in and displayed enlarged. Conversely, when the user moves the remote control device 200 to be close to the display 180, the selected area in the display 180 corresponding to the pointer 205 can be zoomed out and displayed reduced.

When the remote control device 200 moves away from the display 180, the selected area can be zoomed out, and when the remote control device 200 moves to be close to the display 180, the selected area can be zoomed in. Also, when a specific button in the remote control device 200 is being pressed, recognition of up, down, left, or right movements can be excluded. That is, when the remote control device 200 moves away from or close to the display 180, the up, down, left, or right movements are not recognized, and only the forward and backward movements can be recognized. When a specific button in the remote control device 200 is not being pressed, only the pointer 205 moves according to the up, down, left, or right movements of the remote control device 200.

Meanwhile, the movement speed or the movement direction of the pointer 205 can correspond to the movement speed or the movement direction of the remote control device 200. Also, in the present specification, a pointer refers to an object displayed on the display 180 in response to an operation of the remote control device 200. Accordingly, objects of various shapes other than the arrow shape shown in the drawings are possible as the pointer 205. For example, the object can be a concept including a dot, a cursor, a prompt, a thick outline, and the like. In addition, the pointer 205 can be displayed corresponding to any one point among points on a horizontal axis and a vertical axis on the display 180, and can also be displayed corresponding to a plurality of points such as a line and a surface.

Figure 5:
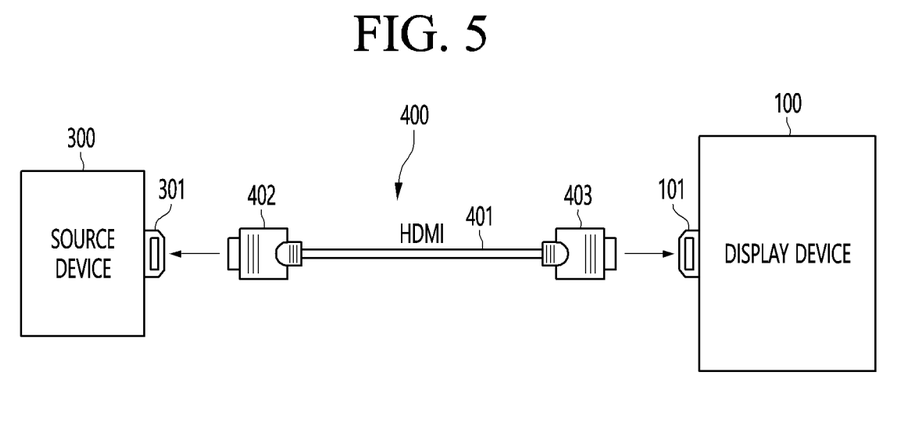
FIG. 5 is a diagram illustrating a display device according to an embodiment of the present disclosure connected to a source device through an HDMI.

Next, FIG. 5 is a diagram illustrating a state in which a display device according to an embodiment of the present disclosure is connected to a source device through an HDMI. A display device 100 can include an HDMI input port 101 to which an HDMI 400 is connected. The HDMI input port 101 can be an HDMI terminal for receiving an HDMI signal from an external device through the HDMI. At least one HDMI input port 101 can be provided in the display device 100.

The display device 100 can receive an HDMI signal through the HDMI 400 connected to the HDMI input port 101 and can output video and audio based on the received HDMI signal. Here, the HDMI signal can include a video signal and an audio signal received from a source device 300 through the HDMI 400.

The HDMI 400 can include an HDMI cable 401 and a pair of connectors 402 and 403. The HDMI cable 401 includes signal lines through which signals are transmitted between the pair of connectors 402 and 403, and the connectors 402 and 403 can be terminals for connecting to the playback device (for example, the display device 100) or the source device 300. The source device 300 can be any one of a set-top box, a Blu-ray player, a DVD player, a game console, a sound bar, a smartphone, a PC, a USB memory, and a home theater, but these are only examples, and the present disclosure is not limited thereto.

The HDMI cable 401 can connect the pair of connectors 402 and 403 and can transmit video, audio, and control signals between the pair of connectors 402 and 403. The HDMI 400 can provide a Transition Minimized Differential Signaling (TMDS) channel, a display data channel (DDC), a consumer electronics control (CEC) line, and a hot plug detect (HPD) line for transmitting video/audio signals.

The pair of connectors 402 and 403 are for connecting the source device 300 that transmits a signal and the playback device 100 that receives the signal transmitted from the source device 300, and can include a first connector 402 and a second connector 403.

One of the first connector 402 and the second connector 403 can be connected to the HDMI output port 301 of the source device 300, and the other of the first connector 402 and the second connector 403 can be connected to the HDMI input port 101 of the display device 100. Hereinafter, it is assumed that the first connector 402 is connected to the HDMI output port 301 of the source device 300 and the second connector 403 is connected to the HDMI input port 101 of the display device 100, but this is only an example for convenience of description, and the present disclosure is not limited thereto.

Figure 7:
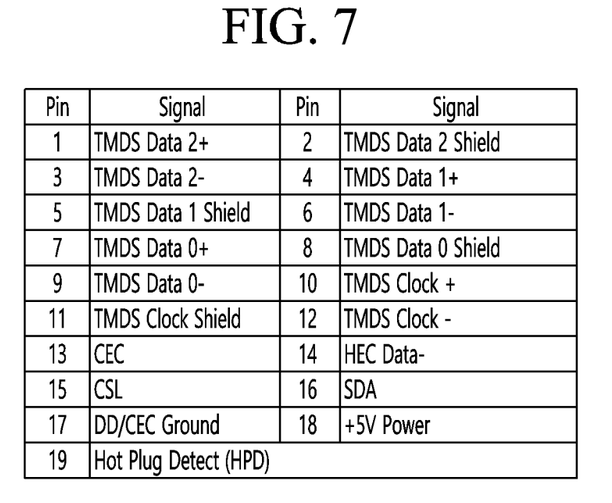
FIG. 7 is a diagram for describing functions of pins provided in an HDMI port according to an embodiment of the present disclosure.

Each of the first and second connectors 402 and 403 can include a plurality of pins. The number of pins provided in the connectors 402 and 403 can vary depending on the HDMI type. For example, when the HDMI is type A, the connectors 402 and 403 can have 19 pins, as shown in FIG. 7. Hereinafter, it is assumed that the connector has 19 pins, but this is only an example for convenience of description, and the present disclosure is not limited thereto.

Each of the HDMI output port 301 and the HDMI input port 101 can be connected to the first connector 402 and the second connector 403, and each of the HDMI output port 301 and the HDMI input port 101 can have a plurality of pins in the same manner as the connectors 402 and 403. The display device 100 can receive an HDMI signal from the source device 300 through the HDMI 400 connected to the HDMI input port 101.

Figure 6:
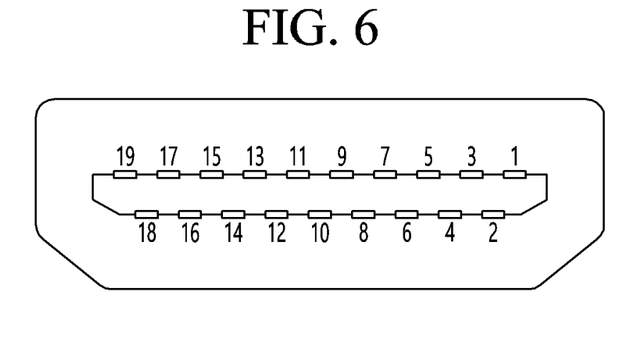
FIG. 6 is a diagram illustrating a structure of an HDMI port according to an embodiment of the present disclosure.
Figure 8:
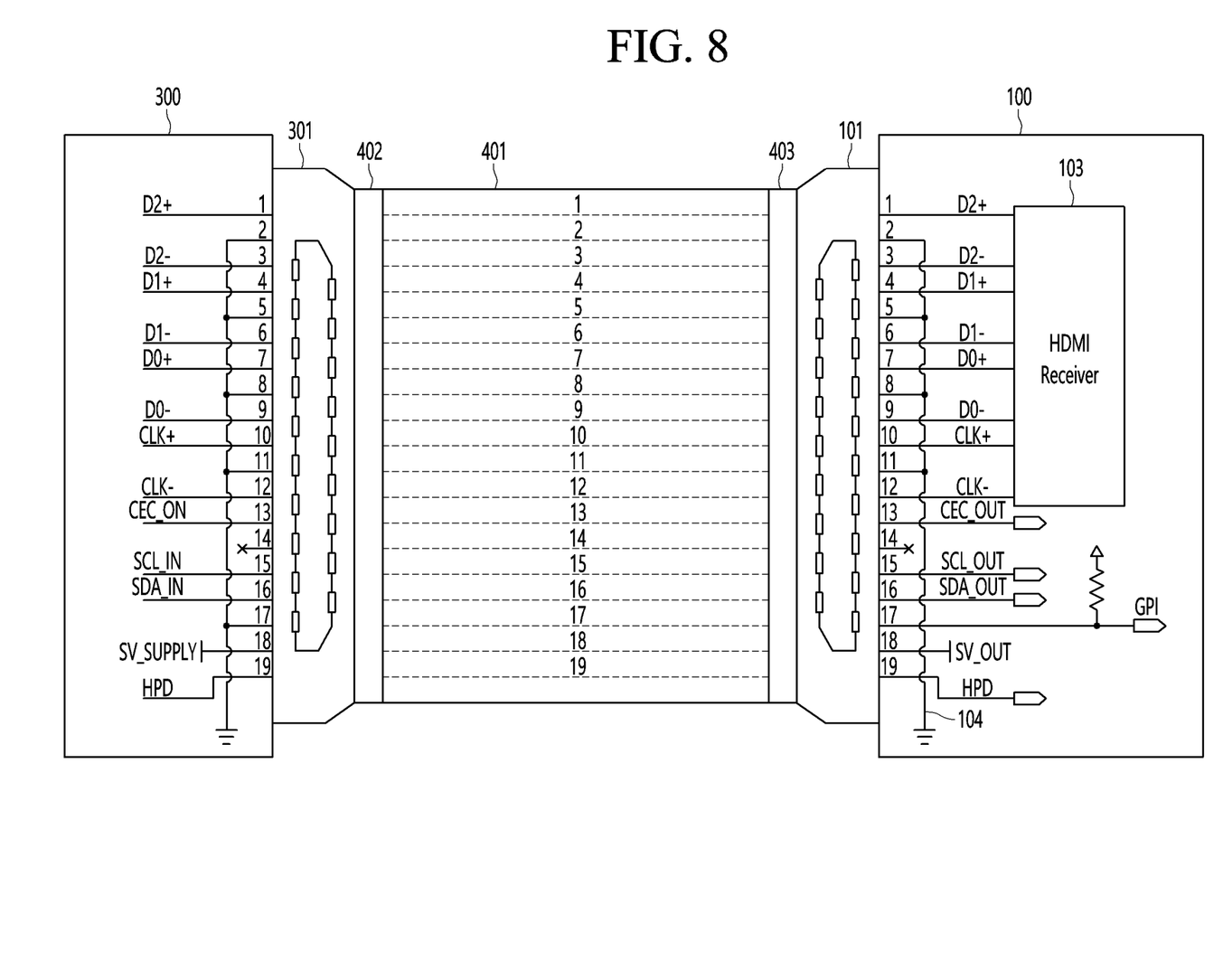
FIG. 8 is a diagram illustrating a source device and a display device connected to each other by an HDMI according to a standard according to an embodiment of the present disclosure.

FIG. 6 is a diagram illustrating a structure of an HDMI port according to an embodiment of the present disclosure, FIG. 7 is a diagram for describing functions of pins provided in an HDMI port according to an embodiment of the present disclosure, and FIG. 8 is a diagram illustrating when a source device and a display device are connected to each other by an HDMI according to a standard. In addition, the HDMI port of FIGS. 6 and 7 can be used as the HDMI output port 301 provided in the source device 300 or the HDMI input port 101 provided in the display device 100.

The HDMI port can include 19 pins. Pins 1 to 12 can be Transition Minimized Differential Signaling (TMDS) signal transmission pins. Pins 1 to 9 constitute three TMDS data channels that transmit data 0, data 1, and data 2, respectively, and each of the TMDS data channels includes three pins. Specifically, pins 1 to 3 are channels for transmitting data 2, pins 4 to 6 are channels for transmitting data 1, and pins 7 to 9 are channels for transmitting data 0. TMDS data 0, 1, and 2 include video information and audio information, and each of the TMDS data channels can be divided into +line, −line, and shield line. In this instance, pin 2 can be connected to the shield line of data 2, pin 5 can be connected to the shield line of data 1, and pin 8 can be connected to the shield line of data 0. Pins 10 to 12 are TMDS clock signal transmission pins and can maintain a signal synchronization state. Similarly, pins 10 to 12 constitute a TMDS clock channel, the TMDS clock channel can be divided into +, −, and shield lines, and pin 11 can be connected to the shield line of the TMDS clock.

Pin 13 is a channel that transmits a consumer electronics control (CEC) signal, and can transmit commands and control data between connected devices.

Pin 14 is an open pin and can be selectively used for an HDMI Ethernet channel (HEC) or an audio return channel (ARC).

Pin 15 (CSL) and pin 16 (SDA) are display data channel (DDC) connection lines, and can be pins that transmit extended display identification channel (EDID) information values between devices.

Pin 17 can be a pin used as a ground line when using DDC, CEC, ARC, or HDC.

Pin 18 can be a pin for supplying power.

Pin 19 can be a pin for transmitting and receiving an HPD signal.

The HDMI can further include an outer shield. The shield is for blocking the signal of noise coming in from the outside, and can also serve as a ground line at the same time. When the HDMI 400 normally manufactured according to the standard is connected between the source device 300 and the display device 100, HDMI 5V power can be supplied from the source device 300 to pin 18 of the display device 100 through the HDMI 400.

When a voltage higher than a predetermined voltage (for example, 2.5V) is supplied to the display device 100 through pin 18 of the HDMI input port 101, the display device 100 can detect a connection with the source device 300. The display device 100 can further include a voltage sensor 1001 (see FIG. 9) that senses a voltage supplied through pin 18 of the HDMI input port 101. When the voltage sensor 1001 senses that a voltage of a predetermined level or higher is supplied through pin 18 of the HDMI input port 101, the voltage sensor 1001 can sense that the source device 300 is connected.

In addition, when the connection with the source device 300 is sensed, the display device 100 can further include an HPD controller 1003 (see FIG. 9) that transmits an HPD signal to the source device 300. This is because the source device 300 can sense the connection with the display device 100 upon receiving the HPD signal from the display device 100.

Figure 9:
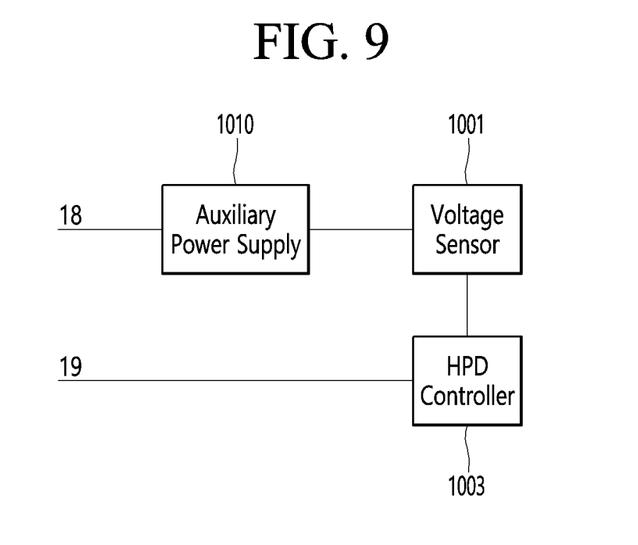
FIG. 9 is a diagram illustrating a connection between pins 18 and 19 of an HDMI input port of a display device according to an embodiment of the present disclosure.

The display device 100 can transmit the HPD signal to the source device 300 and can further transmit EDID. EDID is extended display identification data, and can include information such as a manufacturer name, a product type, an EDID version, a phosphor or filter type, a timing, a screen size, a luminance, a pixel, and the like. The source device 300 can transmit the HDMI signal to the display device 100 based on the EDID.

When the non-standard HDMI 400 that is not manufactured according to the standard is connected between the source device 300 and the display device 100, a voltage lower than 5V can be supplied from the source device 300 to the display device 100 through the HDMI 400. In particular, when a low voltage lower than 2V is supplied to the display device 100 from the source device 300 through the non-standard HDMI 400, the voltage sensor 1001 does not sense whether the source device 300 is connected. Accordingly, since the HPD signal is not transmitted, the HDMI signal cannot be received from the source device 300. Accordingly, the present disclosure is intended to provide a method by which the display device 100 can receive the HDMI signal from the source device 300 even when the non-standard HDMI 400 is connected.

When the voltage is supplied from the source device 300, the display device 100 according to an embodiment of the present disclosure can sense the source device 300 regardless of the magnitude of the supply voltage.

Next, FIG. 9 is a diagram illustrating a connection between pins 18 and 19 of an HDMI input port of a display device according to an embodiment of the present disclosure. First, as described above, the display device 100 can include the voltage sensor 1001 for sensing the voltage supplied from the source device 300 through the HDMI 400, and the HPD controller 1003 for transmitting the HPD signal to the source device 300 according to the voltage sensed by the voltage sensor 1001. In addition, the voltage sensor 1001 and the HPD controller 1003 are merely separated for convenience of description, and can be integrally formed or can be part of the external device interface 135 or the controller 170.

As shown in FIG. 9, the display device 100 can further include an auxiliary power supply 1010. Here, the auxiliary power 1010 is merely an exemplary name for convenience of description, and it is reasonable not to be limited to such a name. When the voltage is supplied from the source device 300, the auxiliary power supply 1010 can supply a voltage higher than a predetermined level to the voltage sensor 1001. The auxiliary power supply 1010 can be connected between pin 18 of the HDMI input port 101 and the voltage sensor 1001.

Specifically, when a minimum voltage at which the voltage sensor 1001 can sense whether it is connected to the source device 300 is a first voltage (for example, 2.5V), and when the voltage is supplied through pin 18, the auxiliary power supply 1010 can supply a second voltage (for example, 5V), which is higher than or equal to the first voltage, to the voltage sensor 1001. That is, the auxiliary power supply 1010 supplies the second voltage to the voltage sensor 1001, regardless of the magnitude of the voltage supplied to pin 18, as long as the voltage is supplied to pin 18. Therefore, the voltage sensor 1001 can sense the connection with the source device 300. The auxiliary power supply 1010 can be implemented in various forms.

Figure 10:
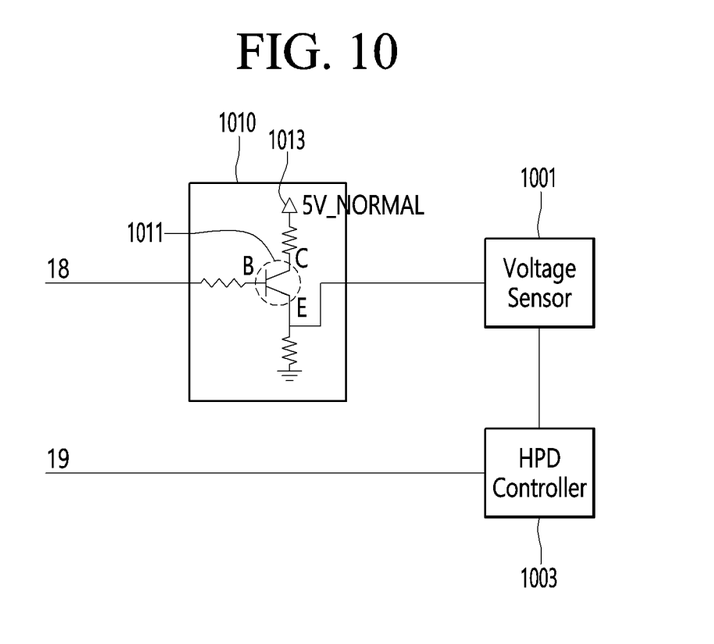
FIG. 10 is a diagram illustrating an auxiliary power supply according to a first embodiment of the present disclosure.

FIG. 10 is a diagram illustrating an auxiliary power supply according to a first embodiment of the present disclosure. As shown in FIG. 10, according to the first embodiment of the present disclosure, the auxiliary power supply 1010 can include a switch 1011 that is turned on when the voltage is supplied from the source device 300, and a normal voltage part 1013 connected to the switch 1011 to supply a voltage higher than or equal to the first voltage.

More specifically, a base B of the switch 1011 can be connected to pin 18 of the HDMI input port 101, a collector C of the switch 1011 can be connected to the normal voltage part 1013, and an emitter E of the switch 1011 can be connected to the voltage sensor 1001. It is assumed that the switch 1011 is a bipolar junction transistor (BJT), but this is only an example for convenience of description, and the type of switch is not limited.

The normal voltage part 1013 can refer to an element that supplies a voltage when the power of the display device 100 is in a turned-on state. According to the first embodiment, the normal voltage part 1013 can supply a voltage higher than or equal to the first voltage, particularly a second voltage, and the second voltage can be 5V, but this is only an example. The second voltage can be set to a voltage higher than the first voltage.

As in the example shown in FIG. 10, when the auxiliary power supply 1010 is formed, and when the voltage is supplied from the source device 300 through pin 18, the switch 1011 can be switched from off to on. As the switch 1011 is turned on, the second voltage supplied from the normal voltage part 1013 can be supplied to the voltage sensor 1001 through the switch 1011. Therefore, even when the voltage supplied from the source device 300 is lower than the first voltage, a voltage higher than the first voltage is supplied to the voltage sensor 1001 by the normal voltage part 1013. Therefore, the connection of the source device 300 can be sensed and the HPD controller 1003 can transmit the HPD signal to the source device 300.

Figure 11:
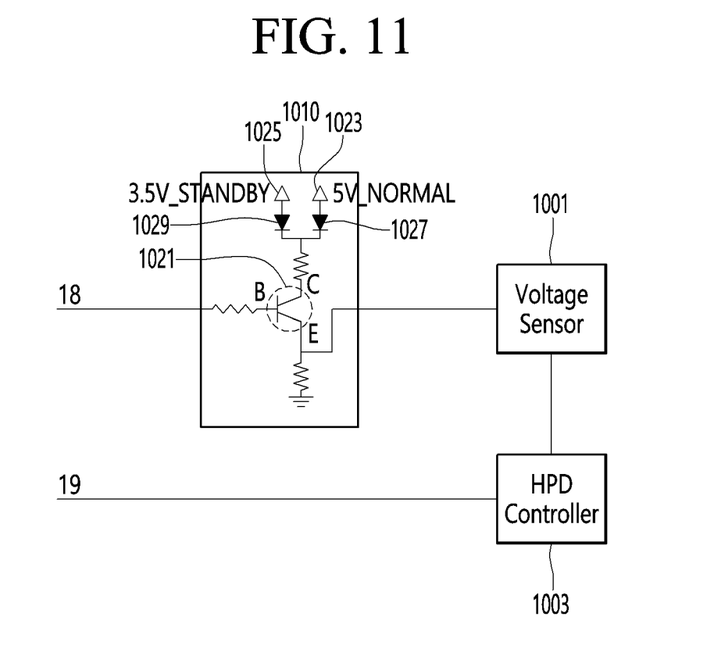
FIG. 11 is a diagram illustrating an auxiliary power supply according to a second embodiment of the present disclosure.

FIG. 11 is a diagram illustrating an auxiliary power supply according to a second embodiment of the present disclosure. As shown in FIG. 11, according to the second embodiment of the present disclosure, the auxiliary power supply 1010 can include a switch 1021, a normal voltage part 1023 connected to the switch 1021 to supply a voltage higher than or equal to the first voltage, and a standby voltage part 1025 connected in parallel to the normal voltage part 1023.

More specifically, a base B of the switch 1021 can be connected to pin 18 of the HDMI input port 101, a collector C of the switch 1021 can be connected to the normal voltage part 1023 and the standby voltage part 1025, and an emitter E of the switch 1021 can be connected to the voltage sensor 1001. As described with reference to FIG. 10, the normal voltage part 1023 is an element that supplies a voltage when the power of the display device 100 is turned on, and can supply a voltage higher than or equal to the first voltage, particularly the second voltage.

The standby voltage part 1025 can be an element that supplies a voltage when the display device 100 is in a standby state. The standby state can refer to a state in which the display device 100 is connected to an external power source but the power is turned off. Accordingly, the standby voltage part 1025 can supply a voltage higher than or equal to the first voltage when the display device 100 is connected to the external power source but the power is turned off. In addition, the normal voltage part 1023 can supply a voltage only when the display device 100 is in a normal state in which power is turned on.

In the example of FIG. 11, both the normal voltage part 1023 and the standby voltage part 1023 can supply a voltage higher than or equal to the first voltage. In particular, the normal voltage part 1023 can supply a second voltage higher than or equal to the first voltage. The second voltage can be 5V. In addition, the standby voltage part 1023 can supply a third voltage higher than the first voltage and lower than the second voltage. The third voltage can be 3.5V. The voltages supplied to the normal voltage part 1023 and the standby voltage part 1023 can be limited by the standard of the display device 100. However, each of the second voltage and the third voltage is only an example, and can be set differently according to the first voltage. Preferably, the second voltage is higher than the first voltage, and the third voltage is between the first voltage and the second voltage.

As in the example shown in FIG. 11, when the auxiliary power supply 1010 is formed, and when the voltage is supplied from the source device 300 through pin 18, the switch 1021 can be switched from off to on. As the switch 1021 is turned on, the second voltage supplied from the normal voltage part 1023 can be supplied to the voltage sensor 1001 through the switch 1021. When the display device 100 is in a standby state, the normal voltage part 1023 does not supply a voltage even when a voltage is supplied from the source device 300. In this instance, since the standby voltage part 1025 supplies a voltage, the voltage sensor 1001 can sense the connection of the source device 300 and the HPD controller 1003 can transmit the HPD signal to the source device 300. That is, according to the example shown in FIG. 11, the display device 100 can sense the connection of the source device 300 even in a standby state, and accordingly transmit the EDID to the source device 300.

According to an embodiment, the display device 100 can further include a first diode 1027 disposed between the normal voltage part 1023 and the switch 1021, and a second diode 1029 disposed between the standby voltage part 1025 and the switch 1021. The first diode 1027 can block the flow of current in the direction of the normal voltage part 1023 by the standby voltage part 1025. The second diode 1029 can block the flow of current in the direction of the standby voltage part 1025 by the normal voltage part 1023.

Figure 12:
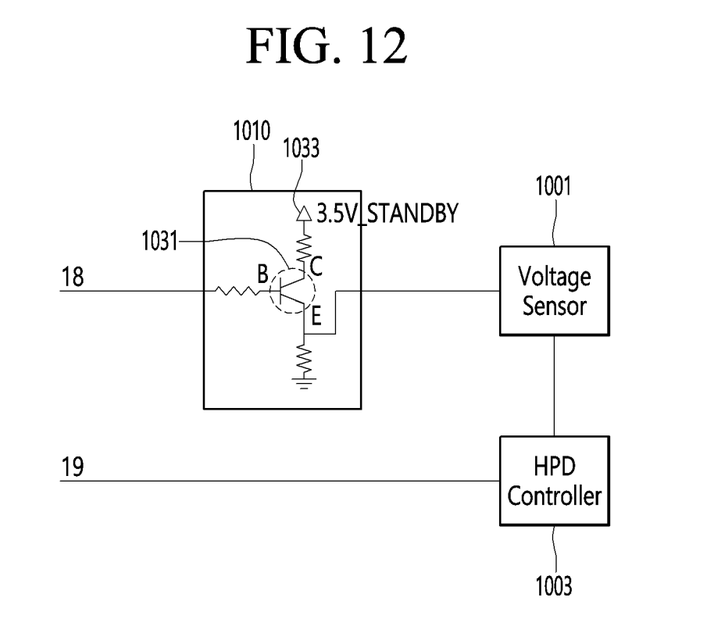
FIG. 12 is a diagram illustrating an auxiliary power supply according to a third embodiment of the present disclosure.

Next, FIG. 12 is a diagram illustrating an auxiliary power supply according to a third embodiment of the present disclosure. As shown in FIG. 12, according to the third embodiment of the present disclosure, the auxiliary power supply 1010 can include a switch 1031 that is turned on when the voltage is supplied from the source device 300, and a standby voltage part 1033 connected to the switch 1031 to supply a voltage higher than or equal to the first voltage.

More specifically, a base B of the switch 1031 can be connected to pin 18 of the HDMI input port 101, a collector C of the switch 1031 can be connected to the standby voltage part 1033, and an emitter E of the switch 1031 can be connected to the voltage sensor 1001. Similar to that described with reference to FIG. 11, the standby voltage part 1033 can refer to an element that is connected to the external power supply of the display device 100, but supplies a voltage when the power is off, that is, in a standby state. The standby voltage part 1033 can supply a voltage higher than or equal to the first voltage, for example, 3.5V, but this is only an example. That is, the voltage supplied by the standby voltage part 133 can be set to a value greater than the first voltage.

As in the example shown in FIG. 12, when the auxiliary power supply 1010 is formed, and when the voltage is supplied from the source device 300 through pin 18, the switch 1031 can be switched from off to on. As the switch 1031 is turned on, the voltage supplied from the standby voltage part 1033 can be supplied to the voltage sensor 1001 through the switch 1031. This is because the standby voltage part 1033 can supply a voltage both when the display device 100 is in a normal state and when the display device 100 is in a standby state. Therefore, even when the voltage supplied from the source device 300 is lower than the first voltage, a voltage higher than the first voltage is supplied to the voltage sensor 1001 by the normal voltage part 1033. Therefore, the connection of the source device 300 can be sensed and the HPD controller 1003 can transmit the HPD signal to the source device 300.

Figure 13:
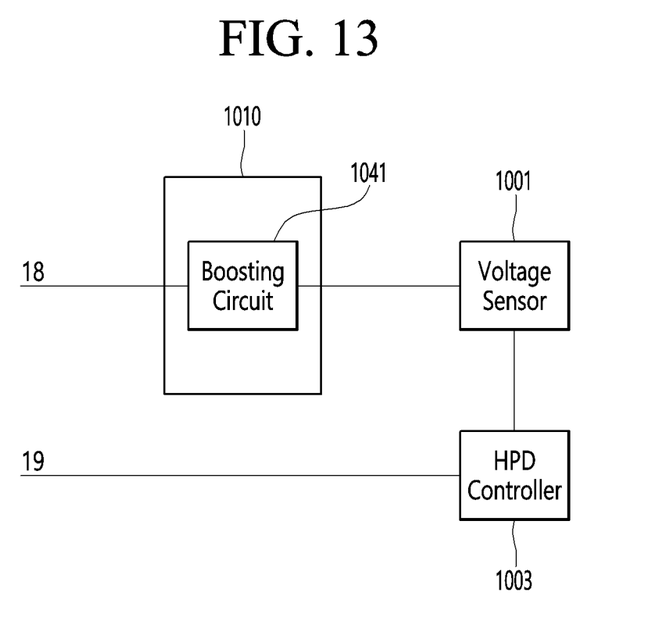
FIG. 13 is a diagram illustrating an auxiliary power supply according to a fourth embodiment of the present disclosure.

FIG. 13 is a diagram illustrating an auxiliary power supply according to a fourth embodiment of the present disclosure. As shown in FIG. 13, the auxiliary power supply 1010 can include a boosting circuit 1041 connected between pin 18 of the HDMI input port 101 and the voltage sensor 1001.

The boosting circuit 1041 can boost the voltage supplied from the source device 300 to a predetermined level or higher. That is, when voltage is supplied from the source device 300, the boosting circuit 1041 can boost the voltage supplied from the source device 300 to a voltage higher than or equal to the first voltage that can be sensed by the voltage sensor 1001. Therefore, even when the voltage supplied from the source device 300 is lower than the first voltage, a voltage higher than the first voltage is supplied to the voltage sensor 1001 by the voltage boosted by the boosting circuit 1041. Therefore, the connection of the source device 300 can be sensed and the HPD controller 1003 can transmit the HPD signal to the source device 300.

As described above, according to various embodiments of the present disclosure, even when the non-standard HDMI 400 is connected to the display device 100 and the voltage lower than the predetermined voltage is supplied from the source device 300, the display device 100 can sense the connection of the source device 300. Accordingly, since the HDMI signal can be received from the source device 300, an image corresponding to the HDMI signal can be displayed on the display 180.

According to an embodiment of the present disclosure, the above-described method can be implemented with codes readable by a processor on a medium in which a program is recorded. Examples of the processor-readable medium can include Hard Disk Drive (HDD), Solid State Disk (SSD), Silicon Disk Drive (SDD), read-only memory (ROM), random access memory (RAM), compact disc read-only memory (CD-ROM), magnetic tape, floppy disk, and optical data storage device. In addition, the computer can include the controller 170 of the display device 100. Accordingly, the above detailed description should not be construed as restrictive in all aspects and should be considered as illustrative. The scope of the present specification should be determined by reasonable interpretation of the appended claims, and all modifications within the equivalent scope of the present specification fall within the scope of the present specification.

The above description is merely illustrative of the technical spirit of the present disclosure, and various modifications and changes can be made by those of ordinary skill in the art, without departing from the scope of the present disclosure. Therefore, the embodiments disclosed in the present disclosure are not intended to limit the technical spirit of the present disclosure, but are intended to explain the technical spirit of the present disclosure. The scope of the technical spirit of the present disclosure is not limited by these embodiments.

The scope of the present disclosure should be interpreted by the appended claims, and all technical ideas within the scope equivalent thereto should be construed as falling within the scope of the present disclosure.

The invention claimed is:

1. A display device, comprising:
 a high definition multimedia interface (HDMI) input port to which an HDMI is connected;
 an HDMI receiver configured to receive an HDMI signal from a source device through the HDMI connected to the HDMI input port;
 a voltage sensor configured to sense a voltage supplied from the source device;
 a hot plug detect (HPD) controller configured to transmit an HPD signal to the source device in response to the voltage detected by the voltage sensor being higher than or equal to a predetermined voltage; and
 an auxiliary power supply configured to supply a voltage higher than or equal to the predetermined voltage to the voltage sensor in response to the voltage supplied from the source device being a first voltage that is less than the predetermined voltage.

2. The display device of claim 1, wherein the auxiliary power supply is connected between pin 18 of the HDMI input port and the voltage sensor.

3. The display device of claim 1, wherein the auxiliary power supply comprises:
 a switch configured to be turned on in response to the voltage being supplied from the source device; and
 a normal voltage part connected to the switch, the normal voltage part being configured to supply the predetermined voltage or higher.

4. The display device of claim 3, wherein a base of the switch is connected to pin 18 of the HDMI input port,
 wherein a collector of the switch is connected to the normal voltage part, and
 wherein an emitter of the switch is connected to the voltage sensor.

5. The display device of claim 3, wherein the auxiliary power supply further comprises a standby voltage part connected in parallel to the normal voltage part, the standby voltage part being configured to supply a standby voltage higher than the first voltage and less than the predetermined voltage, even when the display device is in a standby state.

6. The display device of claim 5, in response to the standby voltage being supplied to the display device, the HPD controller transmits the HPD signal to the source device and the display device senses a connection to the source device.

7. The display device of claim 6, wherein in response to the HPD controller transmitting the HPD signal to the source device, the display device transmits extended display identification data (EDID) to the source device.

8. The display device of claim 5, wherein the auxiliary power supply comprises:
 a first diode disposed between the switch and the normal voltage part; and
 a second diode disposed between the switch and the standby voltage part.

9. The display device of claim 1, wherein the auxiliary power supply comprises:
 a switch configured to be turned on in response to the voltage being supplied from the source device; and
 a standby voltage part connected to the switch, the standby voltage part being configured to supply a standby voltage higher than the first voltage and less than the predetermined voltage, even when the display device is in a standby state.

10. The display device of claim 1, wherein the auxiliary power supply further comprises a boosting circuit configured to boost the voltage supplied from the source device to the predetermined voltage or higher.

11. The display device of claim 1, wherein the HPD controller is connected to pin 19 of the HDMI input port and is connected to the voltage sensor.

12. A display device, comprising:
 a high definition multimedia interface (HDMI) input port to which an HDMI is connected;
 an HDMI receiver configured to receive an HDMI signal from a source device through the HDMI connected to the HDMI input port;
 a voltage sensor configured to sense a voltage supplied from the source device;

a hot plug detect (HPD) controller configured to transmit an HPD signal to the source device in response to the voltage detected by the voltage sensor being higher than or equal to a predetermined voltage; and an auxiliary power supply configured to supply a voltage higher than or equal to the predetermined voltage to the voltage sensor in response to the voltage supplied from the source device being a first voltage that is less than the predetermined voltage, wherein the auxiliary power supply comprises:
- a switch configured to be turned on in response to the voltage being supplied from the source device;
- a standby voltage part connected to the switch, the standby voltage part being configured to supply a standby voltage higher than the first voltage and less than the predetermined voltage, even when the display device is in a standby state; and
- a normal voltage part connected in parallel to the standby voltage part, the normal voltage part being configured to supply the predetermined voltage or higher.

13. The display device of claim 12, wherein the auxiliary power supply further comprises:
- a first diode disposed between the switch and the normal voltage part; and
- a second diode disposed between the switch and the standby voltage part.

14. The display device of claim 12, wherein a base of the switch is connected to pin 18 of the HDMI input port,
wherein a collector of the switch is connected to the normal voltage part, and
wherein an emitter of the switch is connected to the voltage sensor.

15. The display device of claim 14, wherein in response to the standby voltage being supplied to the display device, the HPD controller transmits the HPD signal to the source device and the display device senses a connection to the source device.

16. The display device of claim 15, wherein in response to the HPD controller transmitting the HPD signal to the source device, the display device transmits extended display identification data (EDID) to the source device.

17. The display device of claim 12, wherein the auxiliary power supply is connected between pin 18 of the HDMI input port and the voltage sensor.

18. The display device of claim 17, wherein the HPD controller is connected to pin 19 of the HDMI input port and is connected to the voltage sensor.

19. A display device, comprising:
a high definition multimedia interface (HDMI) input port to which an HDMI is connected;
an HDMI receiver configured to receive an HDMI signal from a source device through the HDMI connected to the HDMI input port;
a voltage sensor configured to sense a voltage supplied from the source device;
a hot plug detect (HPD) controller configured to transmit an HPD signal to the source device in response to the voltage detected by the voltage sensor being higher than or equal to a predetermined voltage; and
an auxiliary power supply configured to supply a voltage higher than or equal to the predetermined voltage to the voltage sensor in response to the voltage supplied from the source device being a first voltage that is less than the predetermined voltage, the auxiliary power supply comprises:
- a switch configured to be turned on in response to the voltage being supplied from the source device;
- a standby voltage part connected to the switch, the standby voltage part being configured to supply a standby voltage higher than the first voltage and less than the predetermined voltage, even when the display device is in a standby state;
- a normal voltage part connected to the switch, the normal voltage part being configured to supply the predetermined voltage or higher, wherein a base of the switch is connected to pin 18 of the HDMI input port,
wherein a collector of the switch is connected to the normal voltage part, and
wherein an emitter of the switch is connected to the voltage sensor.

20. The display device of claim 19, wherein in response to the standby voltage being supplied to the display device, the HPD controller transmits the HPD signal to the source device and the display device senses a connection to the source device, and
wherein in response to the HPD controller transmitting the HPD signal to the source device, the display device transmits extended display identification data (EDID) to the source device.

* * * * *